(12) United States Patent
Voegtle et al.

(10) Patent No.: US 8,403,120 B2
(45) Date of Patent: Mar. 26, 2013

(54) DOUBLE CLUTCH COMPRISING A TORSIONAL VIBRATION DAMPER

(75) Inventors: Benjamin Voegtle, Karlsruhe (DE); Christian Huegel, Rheinau (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 400 days.

(21) Appl. No.: 12/773,077

(22) Filed: May 4, 2010

(65) Prior Publication Data

US 2010/0282560 A1    Nov. 11, 2010

(30) Foreign Application Priority Data

May 6, 2009    (DE) .................. 10 2009 019 876

(51) Int. Cl.
*F16D 25/10* (2006.01)
*F16D 21/06* (2006.01)
*F16D 3/14* (2006.01)

(52) U.S. Cl. ............... 192/48.611; 192/48.8; 192/30 V; 192/55.61

(58) Field of Classification Search .............. 192/48.8, 192/48.607, 48.611, 30 V, 55.61, 70.12, 70.17
See application file for complete search history.

(56) References Cited

U.S. PATENT DOCUMENTS

| | | | |
|---|---|---|---|
| 2005/0279603 A1* | 12/2005 | Agner .................. | 192/48.8 |
| 2008/0271968 A1* | 11/2008 | Metzinger et al. ......... | 192/48.8 |
| 2009/0000896 A1* | 1/2009 | Knowles .................. | 192/48.1 |
| 2011/0272233 A1* | 11/2011 | Arnold et al. ............ | 192/48.1 |
| 2012/0043176 A1* | 2/2012 | Arnold et al. ............ | 192/48.1 |

FOREIGN PATENT DOCUMENTS

DE    102009024219 A1 *  12/2009
DE    102010015431 A1 *  11/2010

\* cited by examiner

*Primary Examiner* — Richard M. Lorence
*Assistant Examiner* — Lillian Nguyen
(74) *Attorney, Agent, or Firm* — Lucas & Mercanti, LLP; Klaus P. Stoffel

(57) ABSTRACT

A double clutch transmission having a wet-running double clutch, a dual mass flywheel and a centrifugal force pendulum. The dual mass flywheel is arranged in a dry chamber between a drive and the double clutch and the centrifugal force pendulum is arranged in a wet chamber of the double clutch.

2 Claims, 4 Drawing Sheets

DOUBLE CLUTCH COMPRISING A TORSIONAL VIBRATION DAMPER

BACKGROUND OF THE INVENTION

The invention concerns a double clutch comprising two wet clutches arranged in a wet chamber, and a torsional vibration damper.

Double clutches for automotive vehicles are well-known in the art.

These double clutches can be configured with two wet clutches superposed radially in a stacked arrangement or disposed axially behind each other for operation in a closed wet chamber filled with a fluid such as hydraulic oil or the like.

It is further possible to arrange torsional vibration dampers in the wet chamber for damping torsional vibrations which can be introduced into the drive train particularly by internal combustion engines such as high torque Diesel engines. With an increasingly erratic running of the internal combustion engine, the torsional vibration dampers, such as, for example, dual mass flywheels, need to be more strongly dimensioned leading to a higher axial design space requirement for the double clutch due to the fact that the torsional vibration damper is arranged adjacent to the wet clutches in axial direction.

In one construction of the double clutch transmission, a dual mass flywheel ("DMFW") comprising a centrifugal force pendulum ("CP") arranged in its interior is situated in the dry chamber. In this case, two clutches are operated in parallel on the secondary side of the DMFW and are both situated in the wet chamber while being arranged behind one another. This makes it possible to optionally arrange an electro motor outside of the clutch (in the dry chamber).

However, this construction of the double clutch transmission has the following drawbacks:

- Due to the axial arrangement of the clutch packs, unused design space remains between the electro motor and the clutch housing despite the electro motor.
- In the arrangement of the centrifugal force pendulum within the DMFW, the effective radius of the centrifugal force pendulum cannot be enlarged at will. The potential of the centrifugal force pendulum is consequently not optimally utilized.
- Moreover, the centrifugal force pendulum runs in a dry environment, i.e. without lubrication. Compared to a centrifugal force pendulum situated in an oil bath, this can result in increased wear.
- An arrangement of the centrifugal force pendulum in the dry chamber can lead to corrosion of the components which results in deterioration of the function.

SUMMARY OF THE INVENTION

It is an object of the present invention to provide a double clutch transmission having a design space separation of the dual mass flywheel (DMFW) and the centrifugal force pendulum (CP), i.e. through a novel arrangement of the system component centrifugal force pendulum.

The DMFW is situated in the dry chamber and screwed directly onto the crankshaft, while the centrifugal force pendulum is arranged in the wet chamber on a diameter that is comparable to that of the electro motor (which is arranged outside of the clutch). Through the novel arrangement of the centrifugal force pendulum, the function of the centrifugal force pendulum is optimized, that is to say, better use is made of the available design space. The novel arrangement does not fundamentally change the pattern of torsional vibration.

BRIEF DESCRIPTION OF THE DRAWINGS

The present invention will be described more closely in the following with reference to preferred embodiments and the appended figures which show.

DETAILED DESCRIPTION OF THE INVENTION

In the appended figures, a drive (e.g., an internal combustion engine 40, a fuel cell or another drive) is identified at reference 1, a secondary mass of the dual mass fly wheel 10 (DMFW) at 2 and a primary mass of the clutch 50 at 3. An electro motor is indicated by 30.

Figure 1:
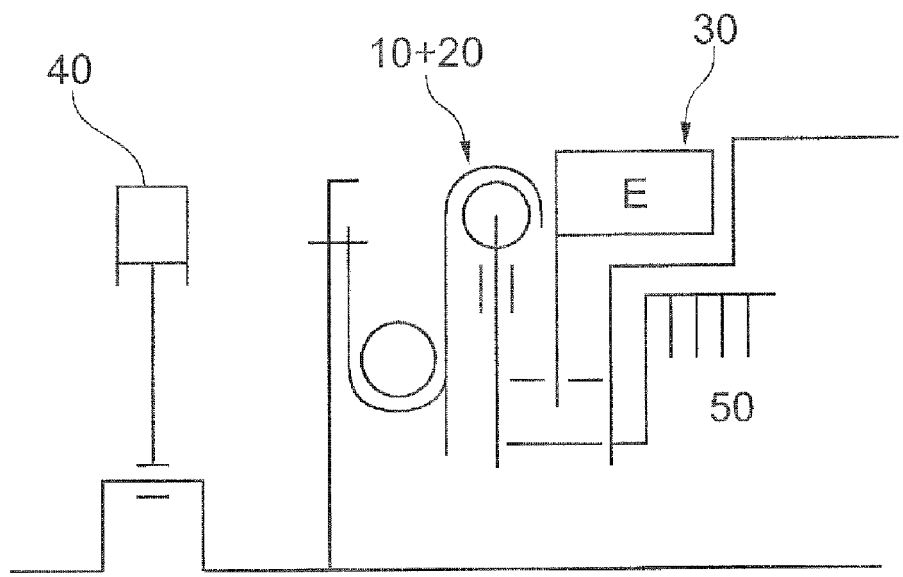
FIG. 1 shows a schematic representation and a block circuit diagram of the initially described construction of the double clutch transmission with a dual mass flywheel ("DMFW") situated in the dry chamber and comprising a centrifugal force pendulum ("CP") arranged therein.
Figure 1:
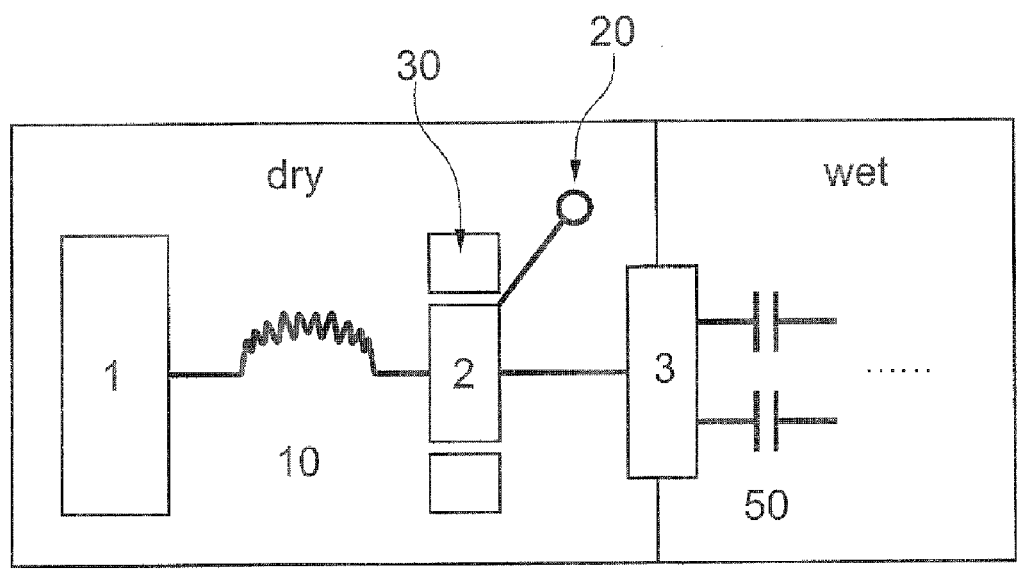
Figure 2:
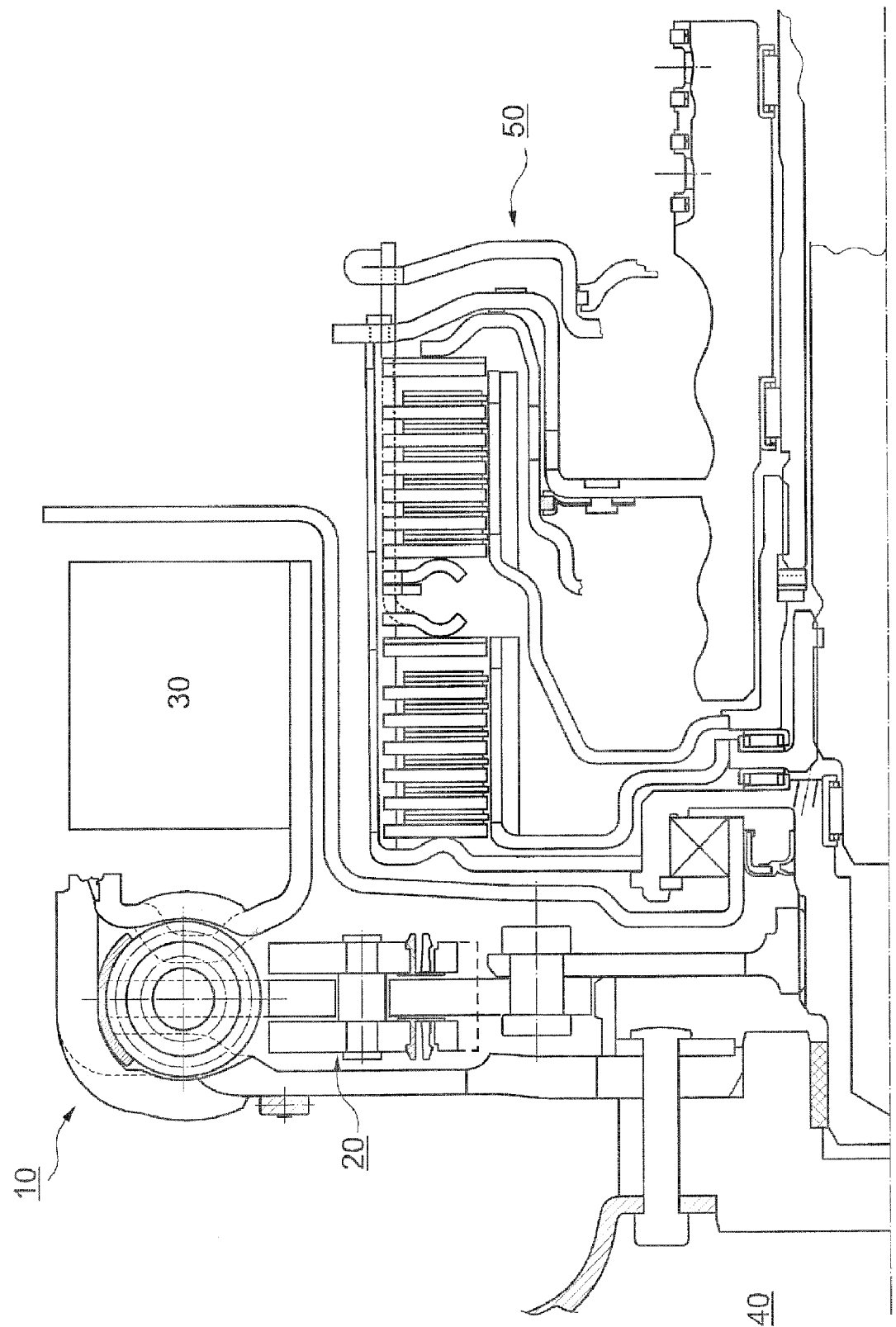
FIG. 2 shows a structural configuration of construction of the double clutch transmission of FIG. 1.

As can be seen in FIGS. 1 and 2, the centrifugal force pendulum (CP) 20 is arranged on the secondary mass 2 of the DMFW 10 in the dry chamber and, further, that the rotor of the electro motor 30 is connected through the primary side of the DMFW 10.

Figure 3:
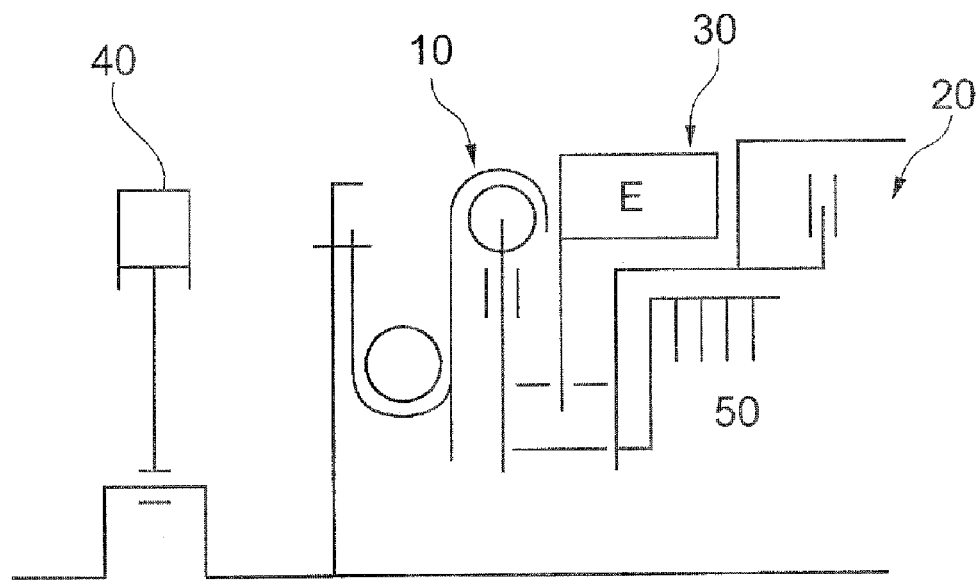
FIG. 3 shows an embodiment of the inventive construction in a schematic representation and as a block circuit diagram.
Figure 3:
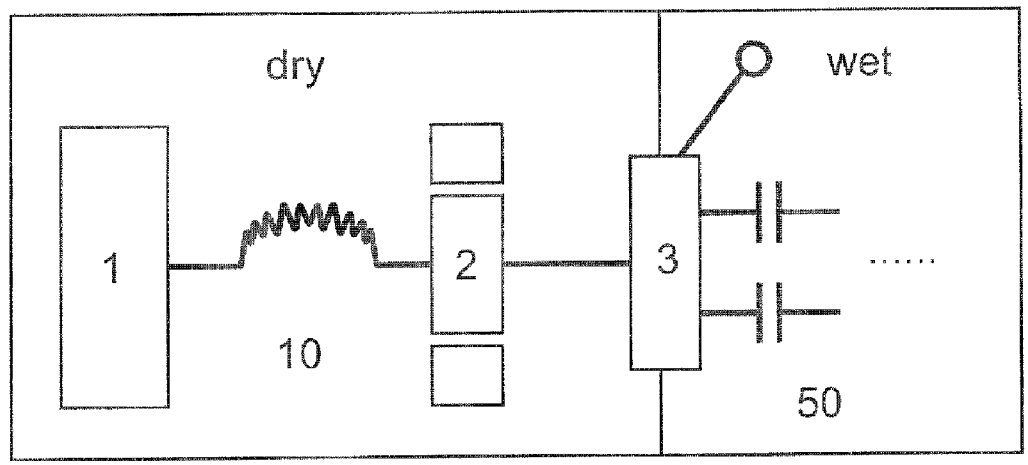
Figure 4:
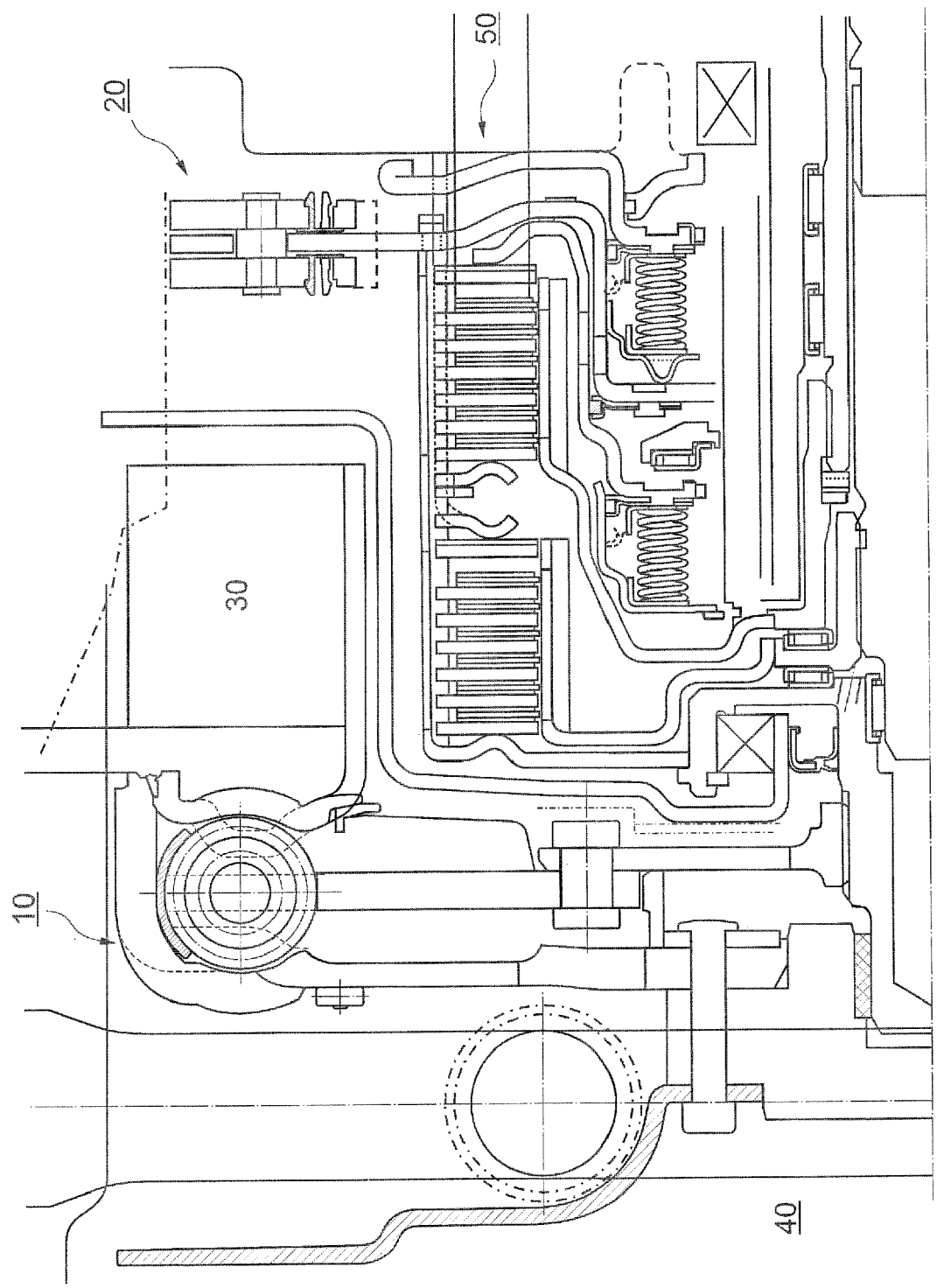
FIG. 4 shows a possible structural configuration of the construction of FIG. 3.

As can be seen in FIGS. 3 and 4, the centrifugal force pendulum 20 is separated from the DMFW 10 and integrated in the wet chamber of the clutch 50 while being connected to the primary mass 3 of the clutch 50.

The present construction can be summarized by the following features:

- a conventional DMFW without a CP (possibly with internal damper) in the dry chamber, and
- the centrifugal force pendulum is arranged in a separate design space from the DMFW and is disposed in the wet chamber.

This construction has the following advantages:

- the centrifugal force pendulum is arranged on a larger effective radius;
- wear of the centrifugal force pendulum is reduced due to the oil lubrication of the wet chamber; and
- corrosion of the centrifugal force pendulum is reduced through the oil lubrication.

The present double clutch has been conceived in particular for double clutch transmissions comprising wet clutches arranged behind one another. A conventional DMFW is arranged upstream of the clutch.

The inventive double clutch is particularly suitable for the torque class <400 Nm. Also, the present double clutch can also be used, inter alia, in hybrid vehicles.

The invention claimed is:

1. A double clutch transmission, comprising:
a wet-running double clutch;
a dual mass flywheel; and
a centrifugal force pendulum, said dual mass flywheel being arranged in a dry chamber between a drive and the double clutch, and said centrifugal force pendulum being arranged in a wet chamber of the double clutch.

2. The double clutch transmission according to claim 1, wherein the centrifugal force pendulum is connected to a primary mass of the double clutch.